United States Patent [19]

Yamamoto

[11] Patent Number: 5,665,914
[45] Date of Patent: Sep. 9, 1997

[54] SEMICONDUCTOR ACCELERATION SENSOR AND ITS FABRICATION METHOD

[75] Inventor: Masahiro Yamamoto, Tokyo, Japan

[73] Assignee: Mitsubishi Denki Kabushiki Kaisha, Tokyo, Japan

[21] Appl. No.: 598,975

[22] Filed: Feb. 9, 1996

[30] Foreign Application Priority Data

May 2, 1995 [JP] Japan ................................. 7-108802

[51] Int. Cl.⁶ ............................................ G01P 15/00
[52] U.S. Cl. .................................... 73/514.16; 73/514.33; 73/514.36
[58] Field of Search ........................... 73/514.16, 514.29, 73/514.33, 514.36, 514.37, 514.38

[56] References Cited

U.S. PATENT DOCUMENTS 5,150,616  9/1992  Kondo et al. ................. 73/514.33

FOREIGN PATENT DOCUMENTS 62-121367  6/1987  Japan .................................. 73/514.33
3-2569     1/1991  Japan .................................. 73/514.36

*Primary Examiner*—Hezron E. Williams
*Assistant Examiner*—Helen C. Kwok
*Attorney, Agent, or Firm*—Leydig, Voit & Mayer

[57]  ABSTRACT

The invention provides a high-reliability inexpensive semiconductor acceleration sensor requiring no special material for a pedestal, making is possible to decrease the number of materials and the number of assembly steps. A semiconductor acceleration sensor includes a circuit substrate having a thick-film circuit including at least a circuit conductor and an insulating layer, a pedestal on the circuit substrate, a flexible acceleration detecting beam supported by the pedestal and deflecting in response to acceleration, a sensor device on the acceleration detecting beam converting deflection of the acceleration detecting beam into an electrical signal, and a conductor connecting the sensor device with the thick-film circuit wherein the pedestal is the same material as at least one of the circuit conductor and the insulating layer.

4 Claims, 2 Drawing Sheets

☐ A PORTION ENCLOSED BY A RECTANGLE DRAWN BY AN ALTERNATE LONG AND SHORT DASH LINE REPRESENTS OVER-GLASS.

A PORTION ENCLOSED BY A RECTANGLE DRAWN BY AN ALTERNATE LONG AND SHORT DASH LINE REPRESENTS OVER-GLASS.

SEMICONDUCTOR ACCELERATION SENSOR AND ITS FABRICATION METHOD

BACKGROUND OF THE INVENTION

1. Field of the Invention

The present invention relates to a semiconductor acceleration sensor used for an industrial-robot attitude control system or an automobile suspension control system.

2. Description of the Related Art

FIG. 4 is a sectional view taken along line 4—4 of FIG. 5 showing an existing semiconductor acceleration sensor. FIG. 5 is a top view of the existing semiconductor acceleration sensor with its cover removed. A plurality of outer leads 11 are soldered, by means of dipping, at a thick-film substrate 7, a ceramic rectangular thin plate. This circuit substrate includes a thick-film circuit in order to transfer an electrical signal outside of the sensor. A rectangular parallelepiped pedestal 4 made of silicon is secured to the thick-film resistance substrate 7 by an epoxy-based adhesive 9. An end of a slender acceleration detecting beam 2 is secured to the pedestal 4 as a cantilever with the epoxy-based adhesive 9. A cover 12 is arranged on the thick-film resistance substrate 7 so as to cover electronic parts arranged on the substrate 7 and the margin of the cover 12 is bonded to the circumference of the thick-film resistance substrate 7 with a silicon based adhesive 13.

The acceleration detecting beam 2 is a flexible beam supported by the pedestal 4 and deflects in accordance with applied acceleration. A sensor device 1 converts the deflection of the beam into an electrical signal and is located almost at the center of and on the acceleration detecting beam 2. The sensor device 1 comprises a bridge circuit (not shown) including a gauge resistor using the piezo-resistance property of a semiconductor material.

Moreover, an amplification circuit 15 for amplifying an electrical signal generated by the sensor device 1 is formed on the acceleration detecting beam 2. To transfer an electrical signal output from the amplification circuit 15 to a temperature compensation circuit 16 on the thick-film substrate 7, a wire (not shown) formed on the acceleration detecting beam 2 by means of diffusion and an Au wire 10 serving as a conductor are arranged between the amplification circuit 15 and the temperature compensation circuit 16.

The temperature compensation circuit 16, which is a thick-film circuit, is formed on the thick-film substrate 7 in order to compensate the temperature characteristic of an electrical signal output from the amplification circuit 15. The temperature compensation circuit 16 comprises a thick-film resistor 5 made of ruthenium oxide ($RuO_2$, $Ru_2O_5$) and a circuit conductor 6 made of printed silver palladium (Ag—Pd) or silver platinum (Ag—Pt) which are printed on the thick-film resistor substrate 7. Moreover, the thick-film resistor 5 and the circuit conductor 6 are covered with over-glass 8 made of lead borosilicate glass ($PbO$—$B_2O_3$—$SiO_2$) as an insulating layer in order to protect the resistance 5 and the conductor 6.

This type of the semiconductor acceleration sensor makes it possible to convert a very small acceleration into an electrical signal by using the piezo-resistance property of the sensor device 1 due to deflection of the acceleration detecting beam 2. Moreover, the sensor makes it possible to amplify an electrical signal generated by the bridge circuit 1 with the amplification circuit 15 and compensate the temperature characteristic of the electrical signal with the temperature compensation circuit 16 and thereafter output the signal to the outside of the sensor through the outer leads 11.

In the case of the existing semiconductor acceleration sensor thus constituted, the silicon pedestal serving as a support for forming the acceleration detecting beam 2 as a cantilever structure is formed by fixing rectangular parallelepiped components made of silicon with the epoxy-base adhesive 9. Therefore, a lot of materials and a lot of fabrication processes are required.

The present invention is made to solve the above problems and its object is to provide a reliable inexpensive semiconductor acceleration sensor requiring no special material as a pedestal and making it possible to decrease the number of materials and the number of assembling processes.

SUMMARY OF THE INVENTION

Semiconductor acceleration sensor according to the invention comprises a circuit substrate having a thick-film circuit including at least a circuit conductor and an insulating layer, a pedestal formed on the circuit substrate, a flexible acceleration detecting beam supported by the pedestal to deflect in accordance with acceleration, a sensor device set on the acceleration detecting beam to convert a deflection of the acceleration detecting beam into an electrical signal, and a conductor for connecting the sensor device with the thick-film circuit; wherein the pedestal is made of the same material as at least either of the circuit conductor and the insulating layer.

In the case of another semiconductor acceleration sensor, a pedestal is provided with a circuit conductor and an insulating layer which are formed by means of printing.

A semiconductor acceleration sensor fabrication method comprises the steps of forming a thick-film circuit including at least a circuit conductor and an insulating layer and a pedestal made of the same material as either the circuit conductor or the insulating layer on a circuit substrate by means of printing at the same time, securing a flexible sensor beam having a sensor device for converting a deflection into an electrical signal in accordance with applied acceleration, and electrically connecting the sensor device with the thick-film circuit.

In the semiconductor acceleration sensor, the pedestal is made of the same material as either of the circuit conductor or the insulating layer.

In the case of another semiconductor acceleration sensor, the circuit conductor and the insulating layer of the pedestal have the same structures as those fabricated by means of printing.

In the case of still another semiconductor acceleration sensor, the thick-film circuit comprising the circuit conductor and the insulating layer and the pedestal made of the same material as either the circuit conductor or insulating layer are formed on the circuit substrate at the same time by means of printing.

DESCRIPTION OF THE PREFERRED EMBODIMENTS

Figure 1:
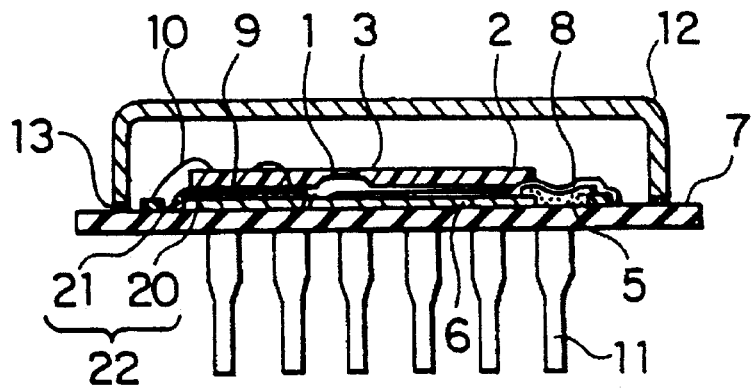
FIG. 1 is a sectional view taken along line 1—1 of FIG. 2 showing an embodiment of a semiconductor acceleration sensor of the present invention.
Figure 2:
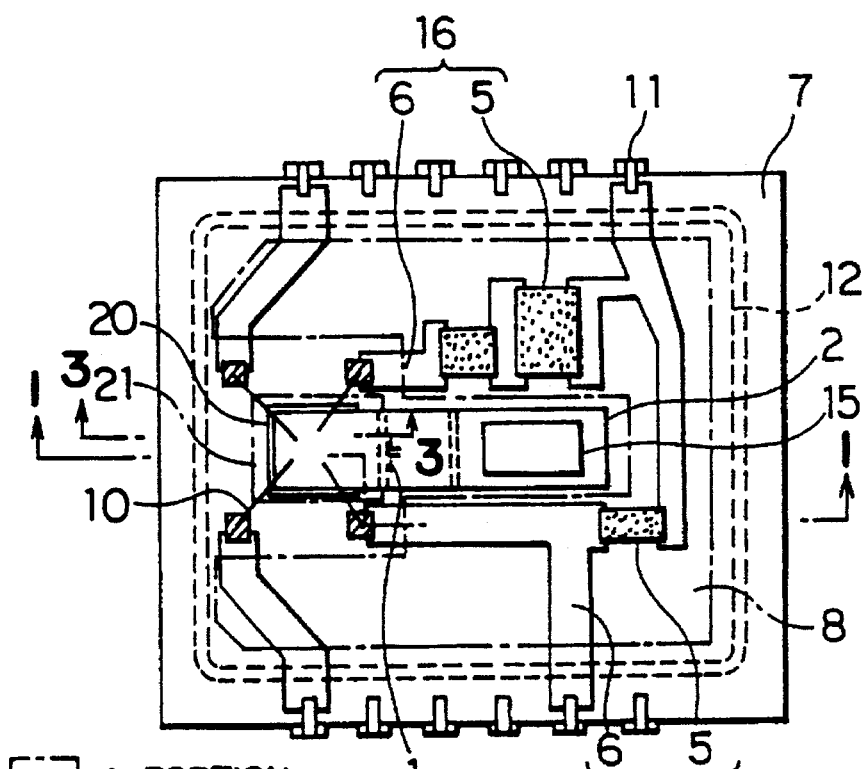
FIG. 2 is a top view of a semiconductor acceleration sensor of the present invention with its cover removed.
Figure 3:
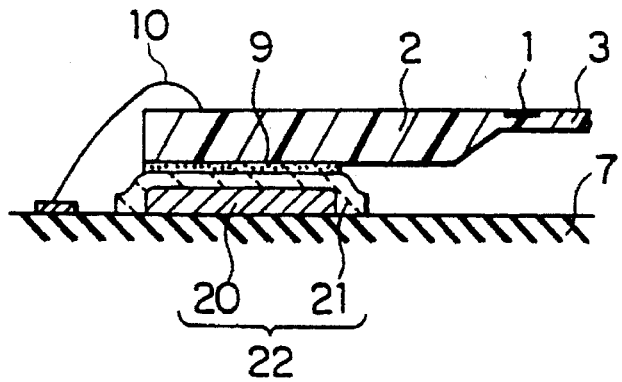
FIG. 3 is an enlarged sectional view of the pedestal and its vicinity taken along line 3—3 of FIG. 2.
Figure 4:
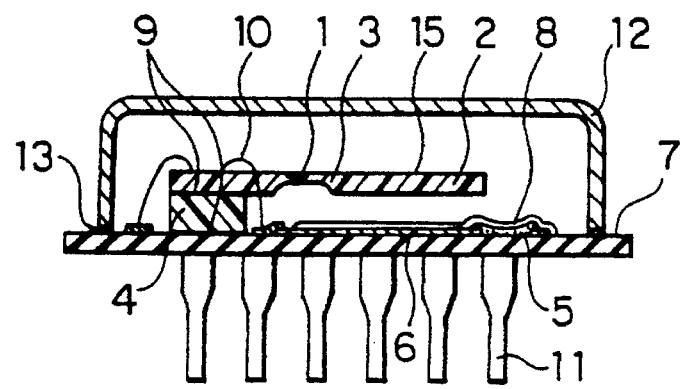
FIG. 4 is a sectional view taken along line 4—4 of FIG. 5 showing an existing semiconductor acceleration sensor.
Figure 5:
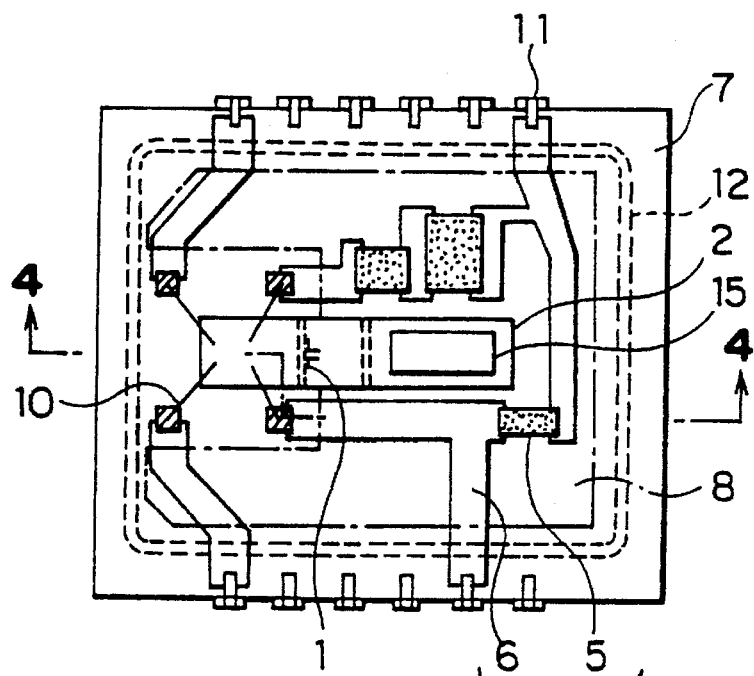
FIG. 5 is a top view of an existing semiconductor acceleration sensor with its cover removed.

FIG. 1 is a sectional view taken along line 1—1 of FIG. 2 showing an embodiment of a semiconductor acceleration sensor of the present invention. FIG. 2 is a top view of the semiconductor acceleration sensor of the present invention with its cover removed. The portion in FIG. 2 enclosed by a rectangle of alternating long and short lines indicates an area covered by an over-glass. FIG. 3 is an enlarged sectional view of a pedestal and its vicinity taken along line 3—3 sectional view of FIG. 2. In these figures, the same as or corresponding elements shown in FIG. 4 have the same reference numbers and their description is omitted. The temperature compensation circuit 16 for compensating the temperature characteristic of an electrical signal output from the amplification circuit 15 is formed on the thick-film substrate 7. The temperature compensation circuit 16 comprises a thick-film resistor 5 made of ruthenium oxide ($RuO_2$, $Ru_2O_5$) and a circuit conductor 6 made of printed silver palladium (Ag—Pd) or silver platinum (Ag—Pt) which are printed on the thick-film substrate 7. Moreover, the thick-film resistor 5 and the circuit conductor 6 are covered with over-glass 8 made of lead borosilicate glass ($PbO$—$B_2O_3$—$SiO_2$) serving as an insulating layer in order to protect the resistor 5 and the conductor 6.

A conductor 20 made of silver palladium or silver platinum, the same material as the circuit conductor 6, and a pedestal 22 made of lead borosilicate glass, the same material as the over-glass 8 covering the conductor 20, are placed at the position where the pedestal 22 is arranged in the prior art structure. The pedestal 22 is electrically floated from the other circuit. The acceleration detecting beam 2 is secured to the pedestal 22 as a cantilever by bonding an end of the beam 2 to the pedestal 22 with the epoxy-based adhesive 9.

To fabricate a semiconductor acceleration sensor with the above structure, ruthenium-oxide paste is screen-printed on the ceramic thick-film substrate 7 and then baked to form the thick-film resistor 5. The silver-palladium paste or silver-platinum paste is screen-printed and then baked to form the circuit conductor 6 and thereby form the temperature compensation circuit 16, and finally lead-borosilicate-glass paste is screen-printed on the thick-film resistor 5 serving as the temperature compensation circuit 16 and the circuit conductor 6 and then baked to form the over-glass 8.

The pedestal 22 comprises the conductor 20 formed by screen-printing silver-palladium or silver-platinum paste, the same material as the circuit conductor 6, and then baking it. The over-glass 8 formed by screen-printing lead-borosilicate-glass paste on the conductor 20 and then baking it. The conductor 20 and the over-glass 21 are formed in the same processes as those of the circuit conductor 6 and the over-glass 8.

Thereafter, the acceleration detecting beam 2 is secured to the pedestal 22 as a cantilever by bonding an end of the beam 2 to the pedestal 22 with the epoxy-based adhesive 9. The Au wire 10 is arranged between the amplification circuit 15 and the temperature compensation circuit 16 in order to electrically connect the amplification circuit 15 formed on the acceleration detecting beam 2 with the temperature compensation circuit 16 on the thick-film substrate 7 as in the prior art.

In the case of a semiconductor acceleration sensor with the above structure, it is unnecessary to prepare a special material for a pedestal and it is possible to decrease the number of parts because the acceleration detecting beam 2 is bonded to the pedestal 22, comprising the conductor 20 and the over-glass 21 formed of the same materials and in the same processes as those of the circuit conductor 6 and the over-glass 8 as a cantilever with the epoxy-based adhesive 9. Moreover, an inexpensive semiconductor acceleration sensor can be provided because the operation for fixing a pedestal is unnecessary, the pedestal 22 is formed in the same processes as the circuit conductor 6 and the over-glass 8, and thereby the number of assembling processes is decreased. Furthermore, because the pedestal 22 is strongly secured to the thick-film substrate 7 compared to an existing pedestal made of silicon, it is not easily removed and thereby, a high-reliability semiconductor acceleration sensor is obtained.

Although a cantilever-type acceleration detecting beam is shown as the acceleration detecting beam 2 in this embodiment, it is also possible to use a acceleration detecting beam having both ends supported.

A semiconductor acceleration sensor according to the invention comprises a circuit substrate having a thick-film circuit including at least a circuit conductor and an insulating layer, a pedestal formed on the circuit substrate, a flexible acceleration detecting beam supported by the pedestal to deflect in accordance with acceleration, a sensor device set on the acceleration detecting beam to convert a deflection of the acceleration detecting beam into an electrical signal, and a conductor for connecting the sensor device with the thick-film circuit; in which the pedestal is made of the same material as at least either of the circuit conductor and the insulating layer. Therefore, the number of materials and the number of processes are decreased and a high-reliability semiconductor acceleration sensor can inexpensively be fabricated.

In another the semiconductor acceleration sensor according to the invention, the circuit conductor and the insulating layer on the pedestal are fabricated by printing and have the same structure. Therefore, it is possible to form the pedestal in the thick-film circuit printing process, decrease the number of materials and the number of processes, and inexpensively fabricate a high reliability semiconductor acceleration sensor.

A method of fabricating a semiconductor acceleration sensor comprises the steps of forming a thick-film circuit including at least a circuit conductor and an insulating layer and a pedestal made of the same material as at least either of the circuit conductor and the insulating layer on a circuit substrate by means of printing at the same time, securing a flexible sensor beam having a sensor device for converting a deflection into an electrical signal to deflect in accordance with acceleration, and electrically connecting the sensor device with the thick-film circuit. Therefore, the thick-film circuit comprising the circuit conductor and insulating layer and the pedestal made of the same material as at least either of the circuit conductor and the insulating layer are simultaneously formed on the circuit substrate. Thus, it is possible to decrease the number of materials and the number of processes and inexpensively fabricate a high-reliability semiconductor acceleration sensor.

What is claimed is:

1. A semiconductor acceleration sensor comprising:
    a circuit substrate;
    a thick film circuit including at least a circuit conductor and a glass insulating layer disposed on said circuit substrate;

a pedestal disposed on said circuit substrate;

a flexible acceleration detecting beam mounted on said pedestal and deflecting in response to an acceleration acting on said beam;

a sensor device disposed on said acceleration detecting beam for converting deflection of said acceleration detecting beam into an electrical signal; and a sensor conductor electrically connecting said sensor device to said thick film circuit, wherein said pedestal includes at least one of said circuit conductor and said glass insulating layer.

2. A semiconductor acceleration sensor comprising;

a circuit substrate:

a thick film circuit including at least a circuit conductor and an insulating layer disposed on said circuit substrate;

a pedestal disposed on said circuit substrate;

a flexible acceleration detecting beam mounted on said pedestal and deflecting in response to an acceleration acting on said beam;

a sensor device disposed on said acceleration detecting beam for converting deflection of said acceleration detecting beam into an electrical signal; and a sensor conductor electrically connecting said sensor device to said thick film circuit, wherein said pedestal includes both of said circuit conductor and said insulating layer.

3. The semiconductor acceleration sensor of claim 2 wherein said insulating layer is a glass layer.

4. A method of fabricating a semiconductor acceleration sensor comprising:

printing a thick film circuit including at least a circuit conductor and a glass insulating layer, simultaneously forming a pedestal made of the same materials as at least one of said circuit conductor and said glass insulating layer on a circuit substrate;

securing to said glass insulating layer a flexible acceleration detecting beam including a sensor device for converting deflection of said flexible acceleration detecting beam into an electrical signal, said flexible acceleration detecting beam deflecting in response to acceleration acting on said beam; and electrically connecting said sensor device to said thick film circuit.

* * * * *